(12) United States Patent
Darroch (10) Patent No.: US 10,099,756 B2
(45) Date of Patent: Oct. 16, 2018

(54) MARKER AND RECOVERY DEVICE (71) Applicant: Neil John Darroch, Burlington (CA)

(72) Inventor: Neil John Darroch, Burlington (CA)

(*) Notice: Subject to any disclaimer, the term of this patent is extended or adjusted under 35 U.S.C. 154(b) by 0 days.

(21) Appl. No.: 14/969,816

(22) Filed: Dec. 15, 2015

(65) Prior Publication Data
US 2016/0167751 A1   Jun. 16, 2016

Related U.S. Application Data (60) Provisional application No. 62/091,893, filed on Dec. 15, 2014.

(51) Int. Cl.
*B63C 9/125* (2006.01)
*B63C 9/00* (2006.01)
*B64D 1/22* (2006.01)

(52) U.S. Cl.
CPC .......... *B63C 9/0005* (2013.01); *B63C 9/1255* (2013.01); *B64D 1/22* (2013.01)

(58) Field of Classification Search
CPC ..... B63C 9/1055; B63C 9/1255; B63C 9/155; B63C 9/20; B63C 9/01; B64D 1/22
See application file for complete search history.

(56) References Cited

U.S. PATENT DOCUMENTS

| | | | | |
|---|---|---|---|---|
| 3,510,895 A * | 5/1970 | Wynne | .................... | B63C 9/155 441/100 |
| 5,098,325 A * | 3/1992 | Kim | ......................... | B63C 9/23 441/88 |
| 5,885,123 A * | 3/1999 | Clifford | ................... | B63B 35/78 441/129 |
| 2013/0273794 A1* | 10/2013 | Lime | ....................... | B63C 9/155 441/89 |

\* cited by examiner

*Primary Examiner* — Andrew Polay
(74) *Attorney, Agent, or Firm* — Moffat & Co (57) ABSTRACT

A marker and recovery device comprising: an enclosure secured to a torso of a wearer; a bladder configured to fit within the enclosure in an uninflated state, the bladder including an elongate tube being physically connected at a first end to the enclosure; a first upper tube fluidly connected to the elongate tube at a distal end of the elongate tube; and a second upper tube fluidly connected to the elongate tube at the distal end of the elongate tube; and an inflation mechanism to inflate the bladder to extend the bladder from the uninflated state to a deployed state in which said elongate tube extends from said enclosure and where the first upper tube and second upper tube form a handle portion at the end of the elongate tube.

15 Claims, 9 Drawing Sheets

MARKER AND RECOVERY DEVICE

RELATED APPLICATIONS

The present application is a non-provisional of U.S. Provisional Application No. 62/091,893, filed Dec. 15, 2014, the entire contents of which are incorporated herein by reference.

FIELD OF THE INVENTION

The present invention relates to a personal marker and recovery device for waterborne activities.

BACKGROUND

When engaged in waterborne activities, such as boating, there is a constant risk of unintentionally falling into the water and being separated from the vessel. To mitigate the risk of drowning, personal floatation devices (PFDs), otherwise known as life jackets, are in widespread use and are responsible for saving countless lives from drowning. The PFDs come in many different configurations but essentially all provide a vest-like structure that fits over the upper torso. The vest is secured by a harness, in the simplest form tie straps, so that the vest is retained on the upper torso. The vest is buoyant and is effective to maintain the wearer afloat and face-up in water.

The vest may be naturally buoyant, such as when made with a closed-cell foam, or may be inflatable to achieve the requisite buoyancy. Inflation may come from a small pressurized gas cylinder, a manual inflation valve, or both. When properly utilized, the vest is capable of supporting the wearer and maintaining the wearer afloat in a stable condition indefinitely.

However, although the PFD supports the wearer, the prompt recovery of the wearer is important due to the exposure to adverse conditions, such as the water temperature and loss of body heat.

Whilst existing vests are made from a high visibility material, such as a day glow orange or other fluorescent material, the rescue of the wearer does depend upon the wearer being visually locatable. In even a relatively small body of calm water, the wearer may not be readily discernable from the general surrounding environment, and, if the wearer is unconscious, is not able to attract attention to rescuers through waving or shouting. This problem is exacerbated when there is any degree of wave motion and of course the ability to spot an individual from an aircraft is extremely difficult.

Various proposals have been made to enhance the visibility to facilitate rescue.

U.S. Pat. No. 3,877,096 to Scesney shows an inflatable floatation device that forms a tetrahedron that can be inflated by a person in distress. This does however require the device to be inflated by the user and remain tethered to the user once deployed.

U.S. Pat. No. 5,800,227 shows a PFD with a folded marker device on the back of the PFD. The marker device may be released. This device however is relatively bulky and may create imbalance such that the face of the wearer is in fact held in to the water rather than supported above the water.

U.S. Pat. No. 3,638,258 discloses a PFD in which an elongate bar is attached to the PFD. The bar may be inflated so that a wand is provided that enhances visibility. The wand is intended to be detachable and therefore its position relative to the wearer may vary.

It is object to the present invention to obviate or mitigate the above disadvantages.

SUMMARY OF THE INVENTION

According to the present invention, a marker and recovery device includes an enclosure to be secured to the torso of a wearer. A deployable tube is secured within the enclosure. The tube is extendable from a stored condition to a deployed condition in which the tube extends from the torso of the wearer.

The tube branches at its top to form at least two tubes which are joined at their top to form a closed figure. The closed figure may be used to facilitate rescue of the wearer, once the wearer is located, by providing a leverage point for a rescuer to grasp and pull the wearer onto a vessel.

BRIEF DESCRIPTION OF THE DRAWINGS

Embodiments of the invention will now be described by way of example only with reference to the accompanying drawings in which.

DETAILED DESCRIPTION

Figure 1:
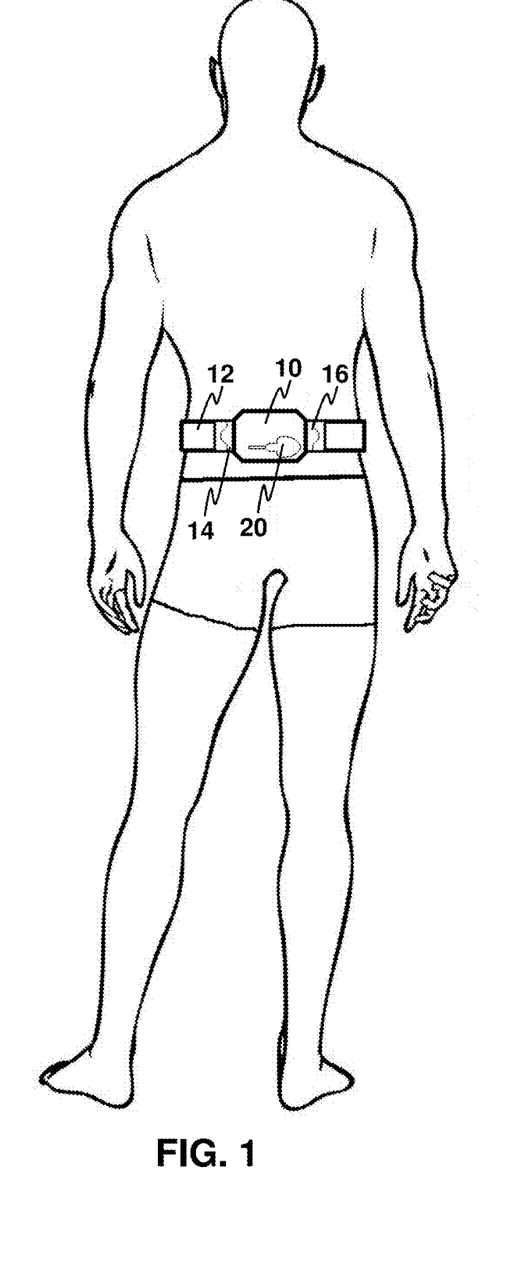
FIG. 1 is a rear elevation of the marker and recovery device.

Referring therefore to FIG. 1, a marker and recovery device has an enclosure 10 located on the back of the wearer. In other embodiments, such as for example those provided in FIGS. 7, 8 and 9, the enclosure 10 may be located at the front of the wearer. In still other embodiments (not shown), the enclosure may be positioned to the side of the user, or may be located at one side of the front or back of the user.

It will be appreciated that the marker and recovery device may be sized according to the typical dimensions of a wearer and may take many different forms depending on the intended application and the severity of the environment in which the marker and recovery device is to be utilized. In the embodiment illustrated in FIG. 1, the enclosure 10 is secured to a belt 12 that passes about the torso of the wearer. The belt 12 may be buoyant to provide some enhanced buoyancy for the wearer, or may be a simple fabric belt.

In the embodiment of FIG. 1, enclosure 10 is attached to belt 12 using clasps 14 and 16. However, other attachment mechanisms are also possible and the present disclosure is not limited to any particular mechanism for connecting enclosure 1.

It will be appreciated that in other embodiments (not shown) the enclosure can also attach directly to a personal flotation device or to a harness instead of to a belt.

In order to inflate the marker and recovery device, a handle 20 may be connected to an inflation mechanism in some embodiments. In the embodiment of FIG. 1, the handle 20 is exterior to the enclosure 10 to ensure easy access in case of emergency.

Figure 2:
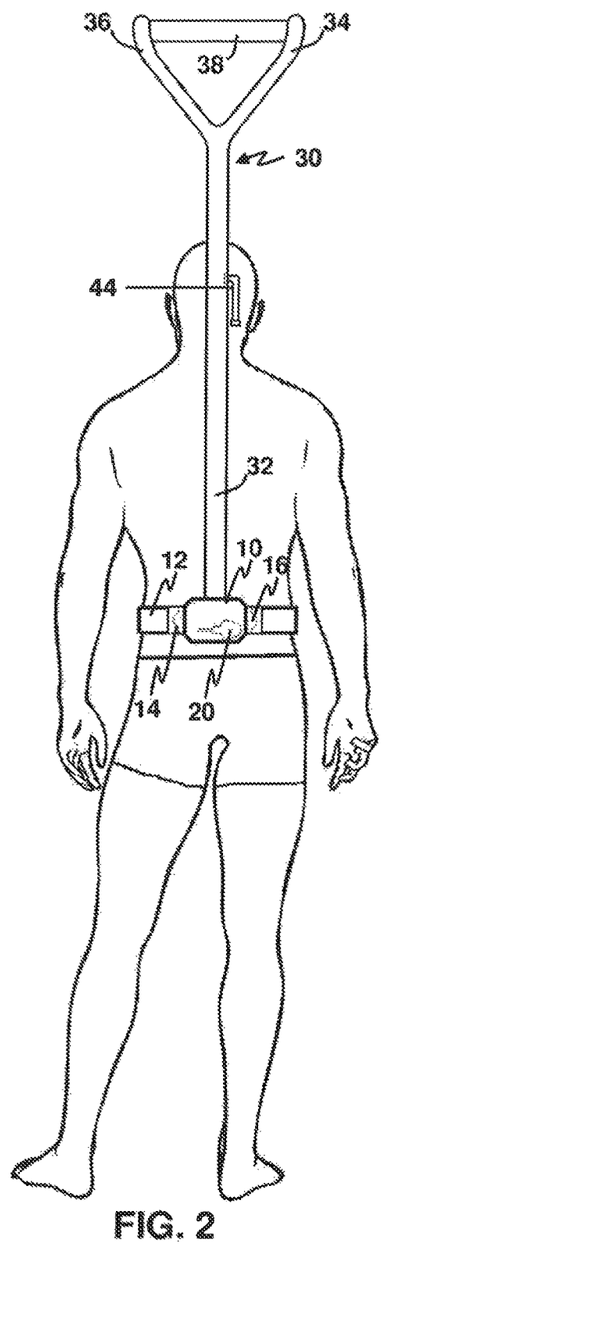
FIG. 2 is a rear elevation similar to FIG. 1 showing the marker and recovery device in a deployed condition.

Reference is now made to FIG. 2. In the embodiment of FIG. 2, an inflatable bladder 30, comprising an inflatable tube 32 which branches into a right inflatable tube 34 and a left inflatable tube 36, is secured to the enclosure 10. The securing may, for example, be done through reinforced webbing 42 located both within or outside of inflatable tube 32, as well as affixed to the inside of enclosure 10. In this way, a wearer may be rescued by lifting the weight of the user using the bladder 30 without the bladder 30 detaching from enclosure 10. Other mechanisms for securing the bladder 30 to enclosure 10 are possible.

In the embodiment of FIG. 2, two upper tubes, namely the right inflatable tube 34 and the left inflatable tube 36, are linked at the top to form a closed loop or handle portion. The link 38 between the top of tube 34 and the top of tube 36 can be a continuation of the inflatable tubes, or it can be composed of some other non-inflatable material such as webbing, cord or netting.

Other embodiments of the marker and recovery device may not have a link between the tops of inflatable tube 34 and inflatable tube 36, so that the left and right inflatable tubes do not form a closed loop.

The size of the closed loop or handle portion may be varied for particular applications.

Figure 3:
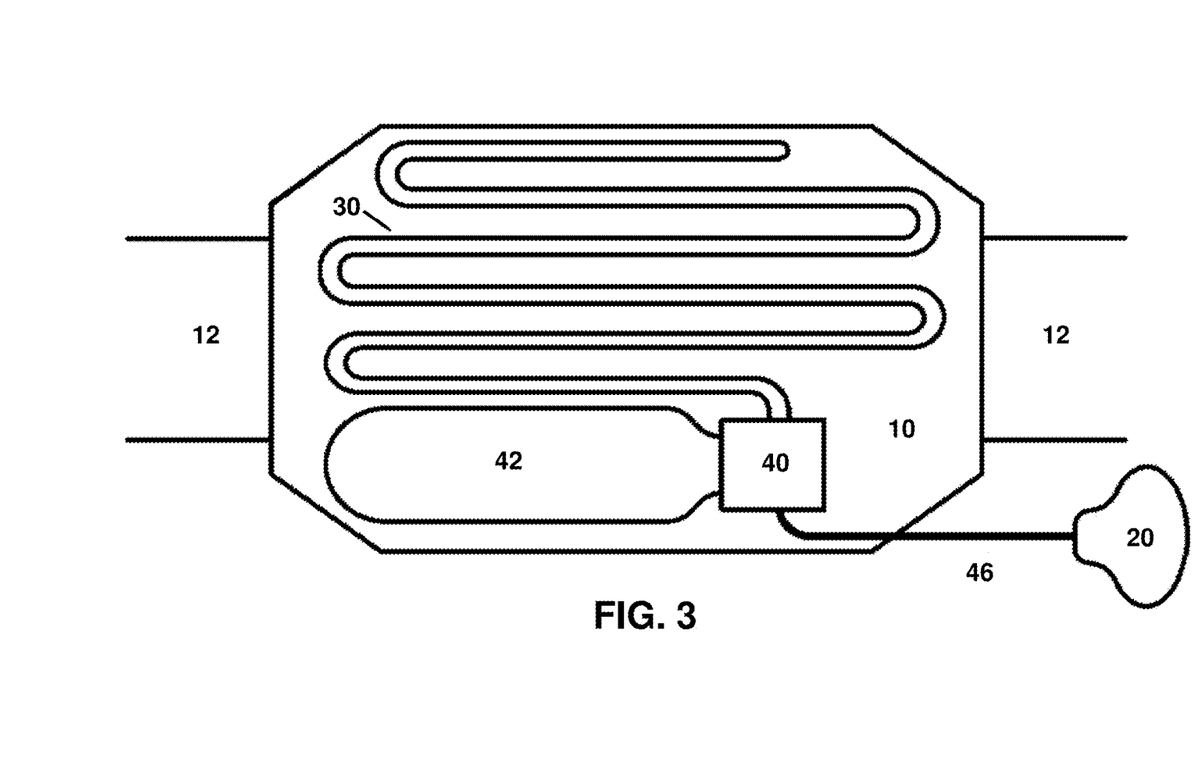
FIG. 3 is a view of the stowed body of the marker and recovery device.

Referring to FIG. 3, the inflatable bladder 30 is stowed in an uninflated state inside the enclosure 10. The inflatable bladder 30 is connected to an inflater 40, which is fed by a gas cylinder 42. The gas cylinder may be deployed either manually or automatically upon contact with the water to supply pressurized gas into the bladder 30. Additionally, a manual oral-inflation valve 44, as for example seen in FIG. 2, may be incorporated on the bladder 30 to allow oral inflation of the bladder in the event that the gas cylinder 42 fails to inflate the bladders adequately. Oral-inflation valve 44 may be located on bladder 30 such that a wearer has easy access to the valve when inflating the bladder.

The inflatable bladder 30 is made from a flaccid, impermeable material such as thermoplastic polyurethane (TPU) or PVC coated nylon fabric. In a typical application, the tubular sleeves comprising the bladder 30 may have a combined height of between 24 and 48 inches and a diameter of between 1 and 3 inches. However, such dimensions are not limiting and are merely provided as examples. Enhanced visibility may be obtained by increasing the lengths of the sleeves.

As can be seen in FIG. 3, the bladder 30 is fixed to the enclosure 10 and, when stored, is folded back on itself so that it fits inside the enclosure 10. Although not shown for the sake of clarity, the enclosure 10 is preferably covered by a detachable panel so that bladder 30 is securely stored when not in use within the body of the enclosure 10. The detachable panel may for example be a flap of material sewn to the enclosure 10 with hook and loop fastener, referred to as Velcro™, tabs or snap tabs that locate the panel and maintain it in situ. However, other forms of panels or coverings, as well as securing mechanisms are also possible.

As can be seen from FIG. 1, prior to deployment, the bladder 30 is maintained in a stored condition within the enclosure 10 and does not interfere with normal operation of the wearer. If however recovery of the wearer is desired, the pressurized gas contained within gas cylinder 42 is released by pulling cord 46 using handle 20, causing the bladder 30 to inflate. This may occur prior to immersion in the water or subsequent to immersion in the water depending upon the particular conditions.

In alternative embodiments, a passive inflation device, such as a foam rubber, coil spring or mechanical linkage could be utilized instead of compressed fluid.

Activation of the inflater 40 supplies pressurized fluid to the interior of the bladder 30 causing the bladder 30 to begin inflation. Initial inflation of the bladder 30 causes the covering panel to be released and the bladder 30 to extend in an upward direction. Continued inflation of the bladder 30 moves the top of bladder 30 progressively upward until it attains a deployed condition where it is fully pressurized and extends upward from the enclosure 10 as seen in FIG. 2. If necessary, additional inflation can be provided from the oral inflation valve 44 to ensure that the bladder 30 is fully inflated. Deflation of the bladder 30 may be accomplished using the oral inflation valve 44.

Recovery of the user is facilitated by the provision of the link 38 which enables the user to be bodily lifted from the water. The link 38 may be located by a boat hook and a rope attached to the closed loop formed by inflatable tubes 34 and 36 and by link 38. Thereafter the wearer may be hoisted from the water and secured on board the rescue vessel.

Figure 4:
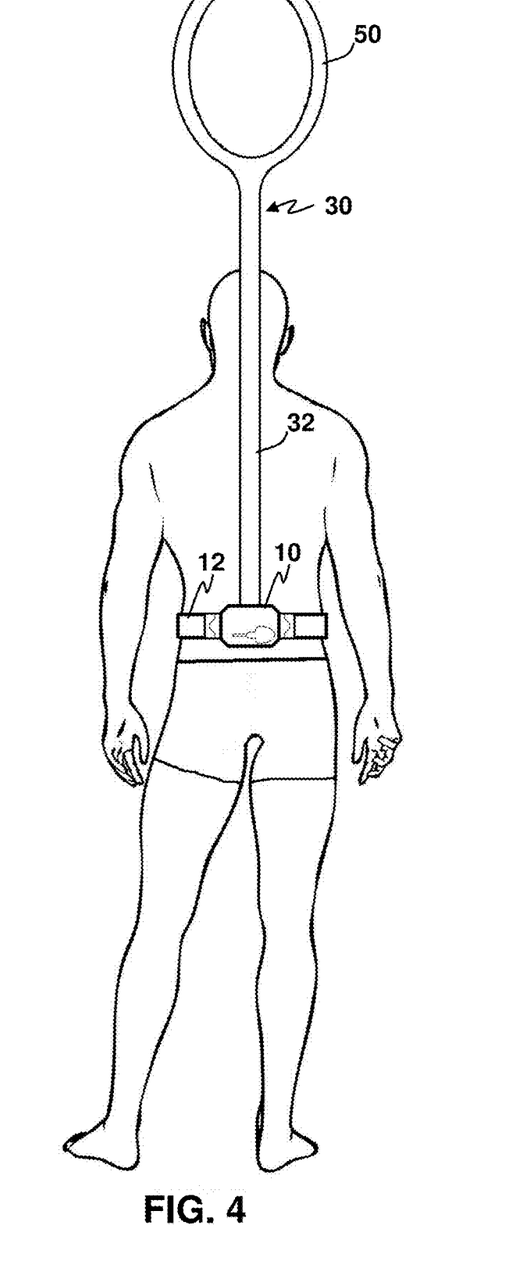
FIG. 4 is a rear elevation of an alternative embodiment of the marker and recovery device in a deployed condition.

Various alternative arrangements may be utilized with the bladder 30. For example, other configurations of the handle portion are shown with regard to FIGS. 4 to 6. In particular, FIG. 4 shows a circular handle portion 50 at the end of elongate inflatable tube 32. Handle portion 50 comprises a first upper portion and second upper portion that are fluidly connected to each other to form a circle.

Figure 5:
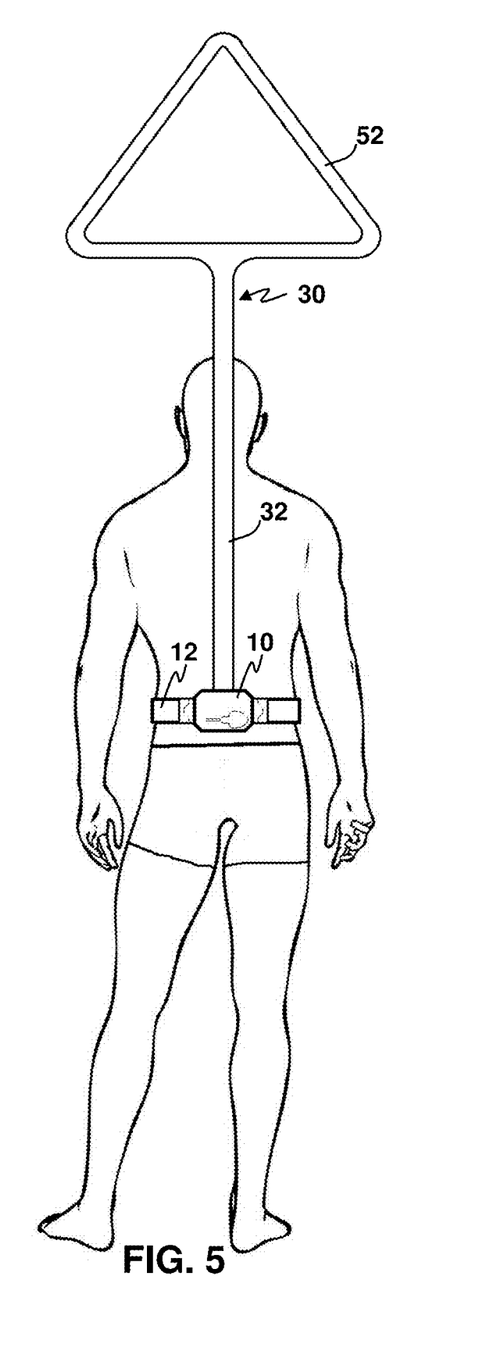
FIG. 5 is a rear elevation of an alternative embodiment of the marker and recovery device in a deployed condition.

Similarly, in FIG. 5 a triangular handle portion 52 is shown. The triangular handle portion is comprised of a first upper tube and a second upper tube which are then connected through a "V" shaped connecting link.

Figure 6:
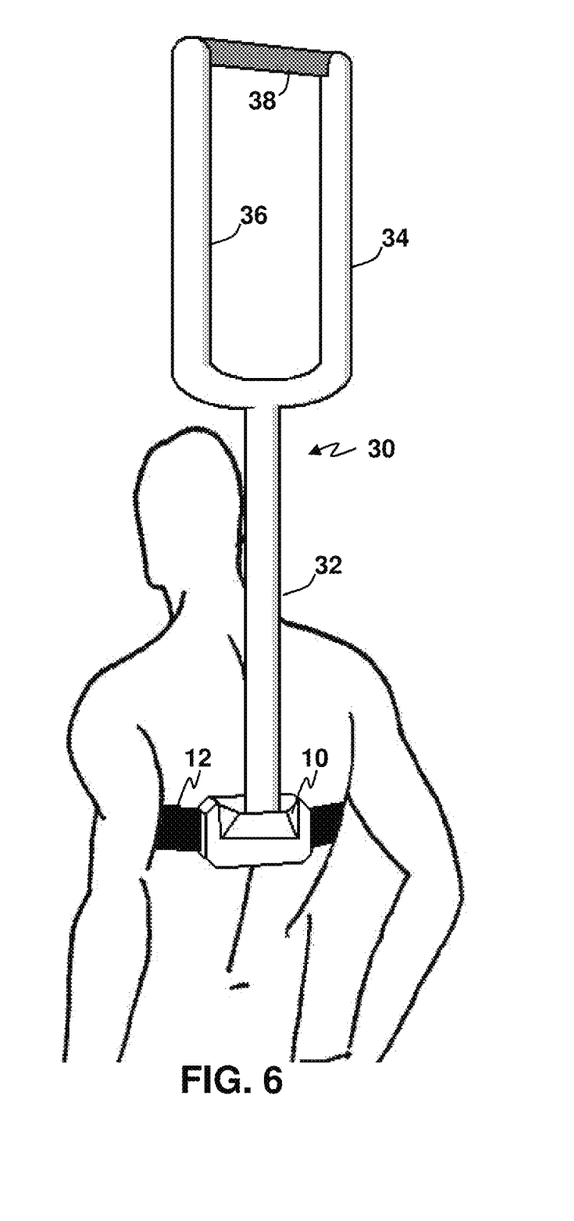
FIG. 6 is a rear perspective view of an alternative embodiment of the marker and recovery device in a deployed condition.

In FIG. 6, a "U" shaped handle portion is provided in which a first upper tube 34 and a second upper tube 36 are connected utilizing a link 38.

Figure 7:
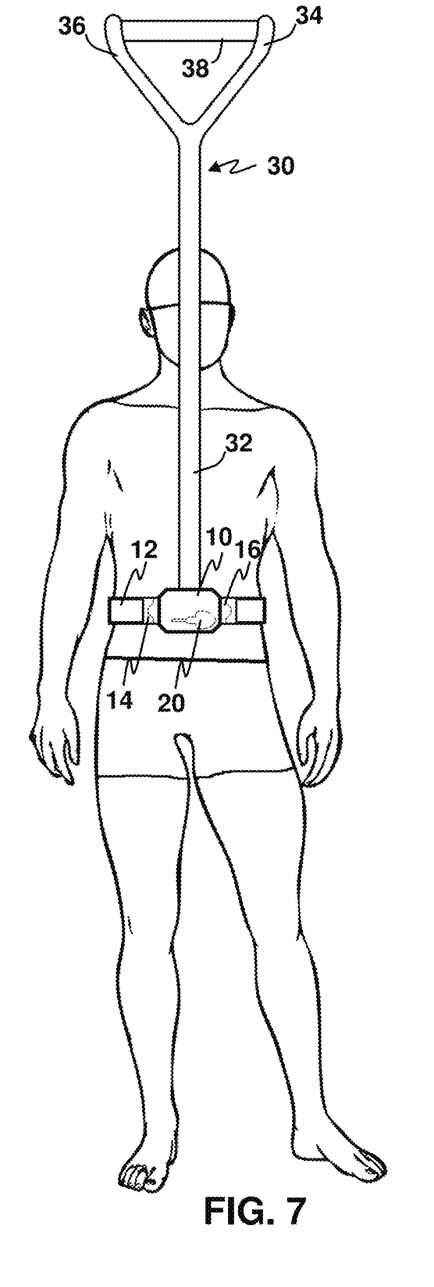
FIG. 7 is a front elevation of the marker and recovery device when oriented on the front of a wearer.

As indicated above, the enclosure 10 can be located in either the front or rear of the torso of a wearer. FIG. 7 shows an example where the enclosure is located at the front of the wearer. In the example of FIG. 7, the upper handle portion of the bladder 30 is triangular, similar to the embodiment of FIG. 2.

Figure 8:
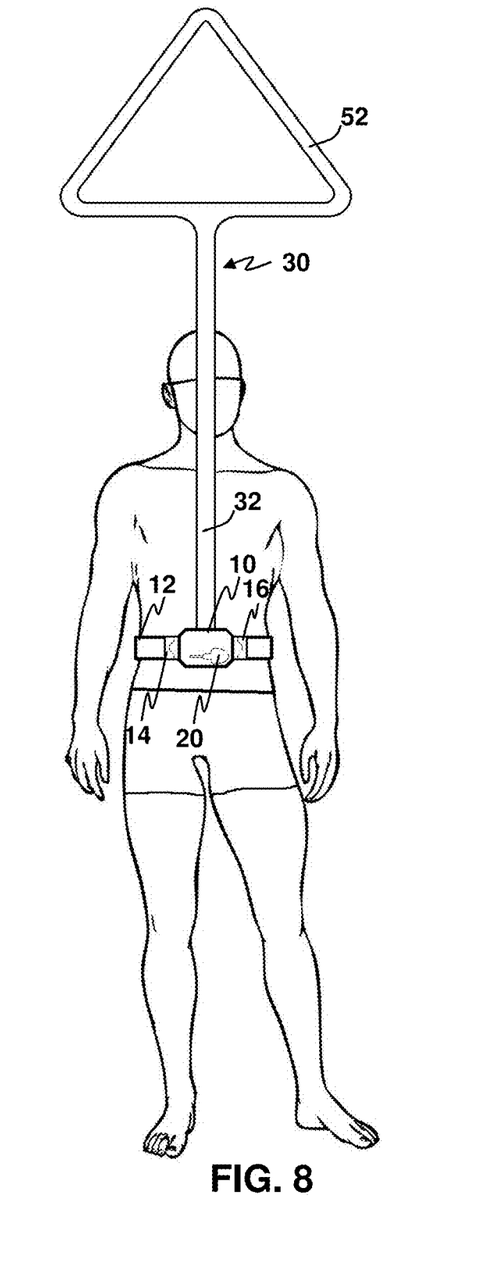
FIG. 8 is a front elevation of an alternative embodiment of the marker and recovery device when oriented on the front of a wearer.

Similarly, FIG. 8 shows an embodiment in which the upper handle portion 52 is triangular as in the embodiment of FIG. 5. However, unlike FIG. 5, in the embodiment of FIG. 8 the enclosure is located at the front of the wearer.

Figure 9:
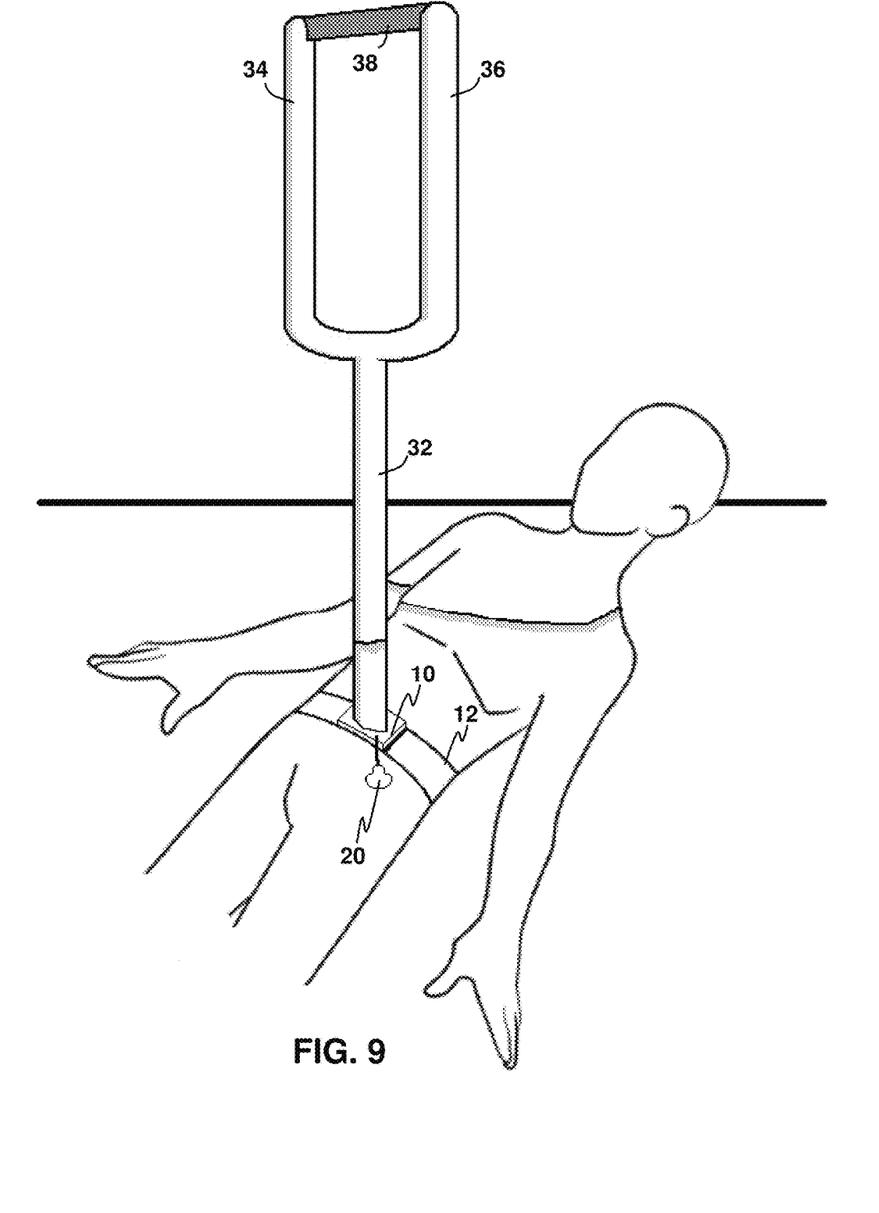
FIG. 9 is a front perspective view of one embodiment of the marker and recovery device in a deployed condition at an angle away from a wearer.

FIG. 9 shows an embodiment in which the inflated bladder extends at an angle to the torso of the wearer. Thus, the wearer may lie back, for example, if wearing a life jacket and the marker and rescue device may still protrude at an angle to the water to make the rescue device more visible. Conversely, in certain embodiments such as those found in FIGS. 2 to 5, the marker and rescue beacon may extend substantially parallel to the torso of the wearer.

In practice, the marker and rescue apparatus is comprised of a material sufficiently strong to support the weight of a wearer. Thus, during a rescue situation a rescuer may lift the wearer out of the water utilizing the rescue apparatus. The strength of the rescue apparatus may depend on the material from which the bladder is formed. Conversely, the bladder may be reinforced, either internally or externally, for example with webbing.

Various advantages exist based on the structure described above with regards to FIGS. 1 to 9. The use of a single elongate inflatable tube 32 allows for a weight saving compared to an arch or other structure. Further, a single tube is less likely to become tangled in rigging on a boat. The use of a single tube further allows for the marker to project further out of the water due to the configuration and weight saving of the structure.

The marker and recovery device may be made to be detachable by providing releasable connectors, such as quick-release buckles, between the enclosure and the belt, harness or personal flotation device it is attached to. In this way an existing PFD may be retrofitted with the marker and recovery device, or the marker and recovery device replaced if necessary.

The marker and recovery device, and in particular the bladder, may be any color. In one embodiment, the bladder will be a highly visible color such as orange or bright green. However, any color for the device may be used. It will also be appreciated that ancillary equipment such as whistles, reflective tape, radar reflective materials or devices, cloth ribbons, and lights may be incorporated into the marker and recovery device as is conventional.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein

The invention claimed is:

1. A marker and recovery device comprising:
    an enclosure adapted to be secured to a torso of a wearer;
    a bladder configured to fit within the enclosure in an uninflated state, the bladder comprising:
    an elongate tube being affixed at a first end to the enclosure;
    a first upper tube fluidly connected to the elongate tube at a distal end of the elongate tube; and
    a second upper tube fluidly connected to the elongate tube at the distal end of the elongate tube;
    link between the first upper tube and second upper tube, the link comprising a string or webbing between the first upper tube and second upper tube; and
    an inflation mechanism to inflate the bladder to extend the bladder from the uninflated state to a deployed state in which said elongate tube extends from said enclosure and where the first upper tube and second upper tube form a handle portion at the end of the elongate tube.

2. The device according to claim 1 wherein the link is fluidly connected to the first upper tube and second upper tube.

3. The device according to claim 1, wherein the enclosure is adapted to be secured on the front of the torso of the wearer.

4. The device according to claim 3, wherein the bladder is adapted to extend at an angle to the torso of the wearer when inflated.

5. The device according to claim 1, wherein the enclosure is adapted to be secured on the rear of the torso of the wearer.

6. The device according to claim 5, wherein the bladder is adapted to extend substantially parallel to the torso of the wearer.

7. The device of claim 1, wherein the inflation mechanism comprises a canister containing a compressed fluid.

8. The device of claim 1, wherein the enclosure is part of a belt adapted to be secured to the torso of the wearer.

9. The device of claim 1, wherein the enclosure is part of a flotation device.

10. The device of claim 1, wherein the handle portion is triangular.

11. The device of claim 1, wherein the handle portion is circular.

12. The device of claim 1 wherein said bladder is stored in an uninflated state using a detachable panel.

13. The device according to claim 1 wherein said bladder is formed from a flaccid, impermeable material.

14. The device according to claim 13 wherein said material is a thermoplastic polyurethane or PVC coated nylon fabric.

15. The device of claim 1, wherein the elongate tube is adapted to extend, when inflated, from the enclosure over a head of the wearer.

* * * * *